United States Patent
Sakuma

(10) Patent No.: US 8,578,904 B2
(45) Date of Patent: Nov. 12, 2013

(54) DEVICE AND METHOD FOR STARTING ENGINE

(75) Inventor: Masafumi Sakuma, Chiryu (JP)

(73) Assignee: Aisin Seiki Kabushiki Kaisha, Kariya-Shi, Aichi-Ken (JP)

(*) Notice: Subject to any disclaimer, the term of this patent is extended or adjusted under 35 U.S.C. 154(b) by 0 days.

(21) Appl. No.: 13/511,620

(22) PCT Filed: Feb. 14, 2011

(86) PCT No.: PCT/JP2011/052997
§ 371 (c)(1),
(2), (4) Date: May 23, 2012

(87) PCT Pub. No.: WO2011/105240
PCT Pub. Date: Sep. 1, 2011

(65) Prior Publication Data
US 2012/0234282 A1  Sep. 20, 2012

(30) Foreign Application Priority Data
Feb. 25, 2010 (JP) ................... 2010-039689

(51) Int. Cl.
*F02N 1/00*  (2006.01)
(52) U.S. Cl.
USPC ............. 123/185.14; 123/179.1; 123/179.25; 290/38 C
(58) Field of Classification Search
USPC ........... 123/179.1, 179.25, 185.14; 290/38 R, 290/38 C, 31, 34
See application file for complete search history.

(56) References Cited

U.S. PATENT DOCUMENTS

| 4,729,465 A | 3/1988 | Reik | |
|---|---|---|---|
| 5,967,106 A * | 10/1999 | Schulze et al. | 123/179.3 |
| 6,291,902 B1 * | 9/2001 | Ogane et al. | 290/34 |

(Continued)

FOREIGN PATENT DOCUMENTS

| CN | 1896492 A | 1/2007 |
|---|---|---|
| CN | 101267971 A | 9/2008 |

(Continued)

OTHER PUBLICATIONS

Machine Translation of EP1106823.*

(Continued)

*Primary Examiner* — Willis R Wolfe, Jr.
*Assistant Examiner* — Anthony L Bacon
(74) *Attorney, Agent, or Firm* — Buchanan Ingersoll & Rooney PC

(57) ABSTRACT

An engine starting method in a parallel-type hybrid vehicle comprises a motor reverse rotation driving step of applying reverse rotation current to drivingly rotate a motor output shaft in a reverse rotation direction of an engine output shaft whereby an elastic member in a damper is elastically deformed to store an urging force that urges the motor output shaft in a normal rotation direction; an urged normal rotation step of stopping the electrification to release the urging force having been stored at the motor reverse rotation driving step whereby the motor output shaft is rotated in the normal rotation direction; a motor normal rotation driving step of applying normal rotation current to drivingly rotate the motor output shaft in the normal rotation direction; and an engine start igniting step of igniting an engine with the engine output shaft being rotated by the rotation at the motor normal rotation driving step.

7 Claims, 7 Drawing Sheets

(56) References Cited

U.S. PATENT DOCUMENTS

| | | | |
|---|---|---|---|
| 6,376,927 B1 * | 4/2002 | Tamai et al. | 290/40 C |
| 6,397,808 B1 * | 6/2002 | Tanaka et al. | 123/179.25 |
| 7,026,724 B1 * | 4/2006 | Blackburn | 307/9.1 |
| 2006/0102138 A1 | 5/2006 | Steiner et al. | |
| 2007/0251482 A1 * | 11/2007 | Shirataki | 123/179.25 |
| 2009/0240387 A1 | 9/2009 | Kawai et al. | |
| 2009/0259391 A1 | 10/2009 | Ando et al. | |
| 2011/0118915 A1 * | 5/2011 | Ortmann et al. | 701/22 |

FOREIGN PATENT DOCUMENTS

| | | |
|---|---|---|
| EP | 1 106 823 A1 | 6/2001 |
| FR | 2 805 571 A1 | 8/2001 |
| JP | 8-035470 A | 2/1996 |
| JP | 2003158830 * | 5/2003 |

OTHER PUBLICATIONS

JP2003158830 English Abstract.*

International Search Report (PCT/ISA/210) issued on Mar. 8, 2011, by the Japanese Patent Office as the International Searching Authority for International Application No. PCT/JP2011/052997.

Koichi Yamaguchi et al., JSAE (Society of Automotive Engineers of Japan), Annual Congress (Spring), 20035246 "Development of Parallel Hybrid System for Light-duty Truck", 2003 (month and date unknown), No. 19-03, pp. 17-20.

Chinese Office Action dated Apr. 3, 2013 issued in the corresponding Chinese Patent Application No. 201180008731.5 and English translation.

European Search Report issued Nov. 15, 2012 by the European Patent Office in corresponding European Application No. 11747204.3 (5 pgs).

* cited by examiner

DEVICE AND METHOD FOR STARTING ENGINE

TECHNICAL FIELD

The present invention relates to an engine starting method by a motor used for vehicle traveling and a device used in the method.

BACKGROUND ART

Recently, under the circumstance that an emission regulation for environmental improvement and a fuel regulation aimed at the reduction of CO2 is being tightened on the worldwide basis, there have been developed parallel-type hybrid vehicles which mount a motor together with an engine as diving sources for the vehicle and which are capable of traveling in the combination of the output power of the motor and the output power of the engine. Generally, in the parallel-type hybrid vehicles like this, within a low rotational zone, the vehicle is driven by the motor excelling in acceleration response in place of the engine which does not excel in emission and efficiency, and within middle and high rotational speed zones, the vehicle is driven primary by the engine the efficiency of which becomes excellent within the zones. In non-patent document 1 describing the parallel-type hybrid vehicles, as shown in FIG. 11, there is known one which is provided with a diesel engine 201, a flat type motor 202 in direct connection with a crankshaft of the diesel engine 201, an inverter 203 for controlling the flat type motor 202, a battery 204 for storing regenerative electricity from the flat type motor 202, a transmission 205 for changing and transmitting the rotation of an output shaft of the flat type motor 202 to a drive shaft 207, a clutch 206 provided between the flat type motor 202 and the transmission 205, and a differential gear 210 for transmitting the rotation of the drive shaft 207 to an axle shaft 209 for wheels 208. The emissions and CO2 generated by the vehicle can be reduced simultaneously by the parallel-type hybrid vehicle like this.

PRIOR ART DOCUMENT

Non-Patent Document

Non-Patent Document 1: 2003 JSAE (Society of Automotive Engineers of Japan) Annual Congress (Spring) 20035246 "Development of Parallel Hybrid System for Light-duty Truck"

SUMMARY OF THE INVENTION

Problem to be Solved by the Invention

However, in the parallel-type hybrid vehicle of the non-patent document 1, in starting the engine, a starter dedicated therefor is not used, but the flat type motor used in the hybrid system is used. Thus, the motor is required to have a motor performance which is also able to output the torque necessary for ignition of the engine. The required torque includes a starting torque for rotating the crankshaft (engine output shaft) and the like and an acceleration torque for accelerating the rotation of the crankshaft and the like and becomes a large torque. Thus, there arises a problem in that the motor should be one being strong and becomes large in dimension.

Therefore, the present invention has been made taking the foregoing circumstances into consideration, and an object thereof is to provide an engine starting method which, in a motor device used at the time of traveling of a parallel type hybrid vehicle, is capable of generating a large starting torque at the time of engine starting in the vehicle and capable of downsizing the device, as well as a device used in the method.

Measures for Solving the Problem

In order to solve the aforementioned problem, the feature in construction of an engine starting method according to the present invention resides in comprising a motor reverse rotation driving step of applying reverse rotation current to a motor to drivingly rotate a motor output shaft connected to the motor from an initial rotational position at which the motor begins to rotate, in a reverse rotation direction opposite in rotation to a normal rotation direction for the motor output shaft whereby by the driving in the reverse rotation direction, a second member connected to the motor output shaft is displaced relative to a first member connected to an engine output shaft, in the reverse rotation direction from a neutral position where the first member and the second member correspond to each other in the circumferential direction, to elastically deform an elastic member thereby to make the elastic member store an urging force that urges the motor output shaft in the normal rotation direction; an urged normal rotation step of stopping the electrification to the motor to release the urging force of the elastic member to make the motor output shaft rotate in the normal rotation direction so that the second member having been displaced from the neutral position relative to the first member in the reverse rotation direction returns to the neutral position; a motor normal rotation driving step of applying normal rotation current to the motor to drivingly rotate the motor output shaft in the normal rotation direction; and an engine start igniting step of igniting an engine with the engine output shaft being rotated by the rotation at the motor normal rotation driving step.

The feature in construction of an engine starting device according to the present invention resides in comprising an engine output shaft and a motor output shaft provided between an engine and a motor that are provided for driving a vehicle; a damper having an elastic member that absorbs variations in rotation of the engine output shaft and the motor output shaft; the dumber having a fist member connected to the engine output shaft and a second member connected to the motor output shaft, and the elastic member being interposed between the first member and the second member; a rotational position detecting section that detects the rotational position of the motor output shaft relative to the engine output shaft; a reverse rotation driving control mechanism that applies reverse rotation current to the motor to rotationally drive the motor output shaft from an initial rotational position at which the motor begins to rotate, in a reverse rotation direction opposite to a normal rotation direction whereby by the driving of the motor output shaft in the reverse direction, the second member is displaced in the reverse rotation direction of the motor from the neutral position at which the first member corresponds to the second member in a circumferential direction, to make the elastic member store an urging force that urges the motor output shaft in the normal rotation direction; an urging force releasing control mechanism that detects by the rotational position detecting section a predetermined driving rotation stopping position of the motor output shaft rotated by the reverse rotation driving control mechanism in the reverse rotation direction and that stops the application of the reverse rotation current based on a detection signal from the rotational position detecting section to release the urging force of the elastic member so that the second member displaced from the neutral position in the reverse rotation direction returns to the neutral position; and a normal rotation driving control mechanism that detects by the rotational position detecting section a predetermined driving rotation starting position of the motor output shaft rotated by the urging force of the elastic member in the normal rotation direction of the engine output shaft and that applies normal rotation current to the motor based on a detection signal from the rotational position detecting section to rotationally drive the motor output shaft in the normal rotation direction.

FORM FOR PRACTICING THE INVENTION

Embodiment 1

Figure 1:
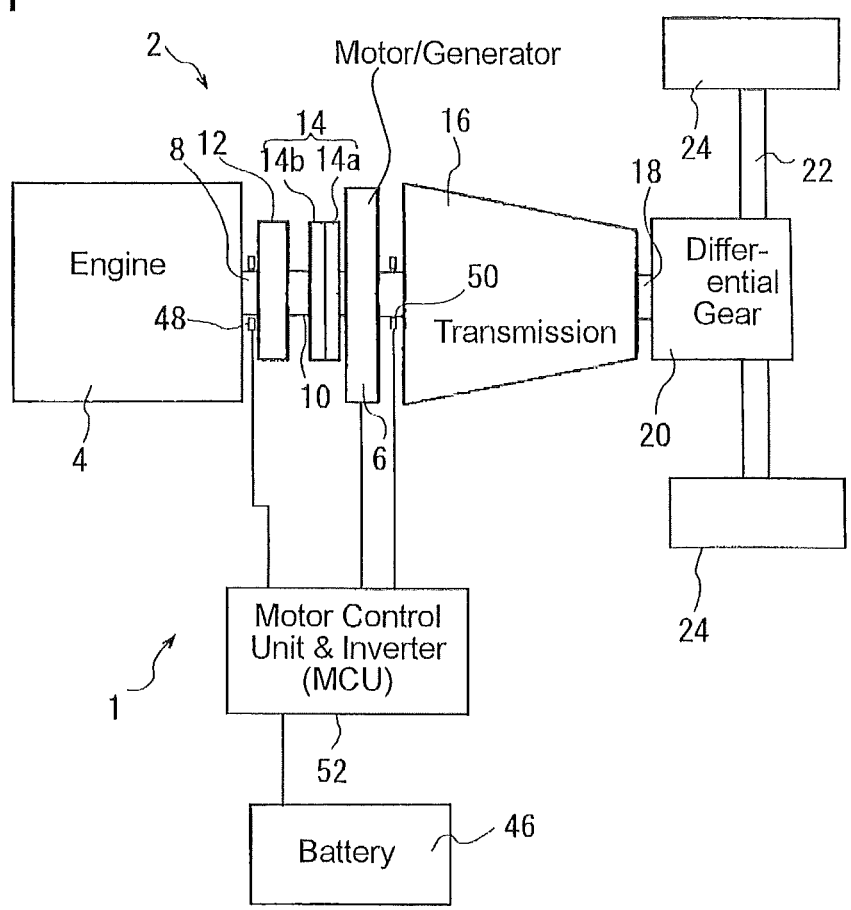
FIG. 1 is a schematic diagram showing a parallel-type hybrid drive system equipped with an engine starting device in an embodiment according to the present invention.
Figure 2:
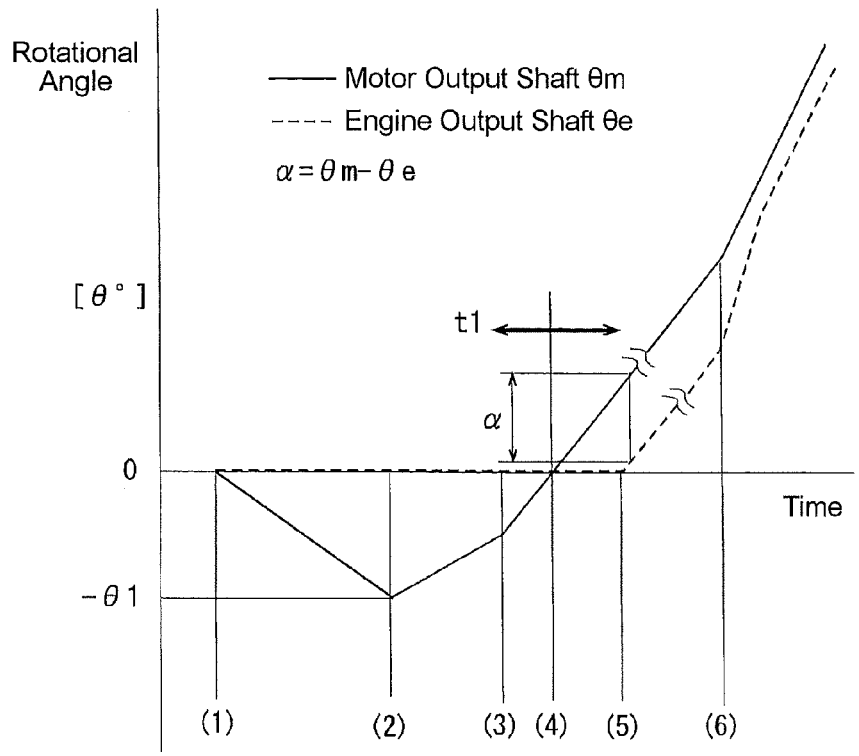
FIG. 2 is a graph showing the time-dependent variations in rotational angle of a motor output shaft and an engine output shaft at the time of an engine starting.

An embodiment in which an engine starting device according to the present invention is used in a parallel-type hybrid drive system will be described with reference to the drawings. FIG. 1 is a schematic construction diagram showing the outline of the parallel-type hybrid drive system, and FIG. 2 is a graph showing the time-dependent variations in rotational angles θ of a motor output shaft and an engine output shaft at the time of an engine starting.

As shown in FIG. 1, the parallel-type hybrid drive system 1 is provided with an engine starting device. The engine starting device is composed of an engine 4 operating as a driving power source and a motor 6 operating also as a generator. An engine output shaft 8 of the engine 4 is connected to a motor output shaft 10 of the motor 6 through a damper 12 and a clutch 14. The motor output shaft 10 is connected to a speed-reduction transmission 16, and the speed-reduction transmission 16 is connected to a driving shaft 18. The driving shaft 18 is connected to a axle shaft 22 through a differential gear 20, and a pair of wheels 24 as driving wheels are connected to both ends of the axle shaft 22.

Figure 5:
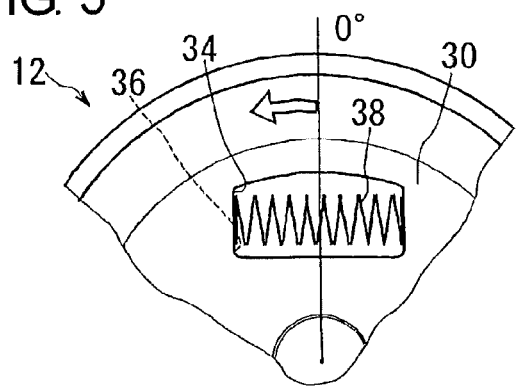
FIG. 5 is a view showing the damper being at an initial rotational position.

The engine 4 is, for example, a water-cooled gasoline engine and has an output required to make the wheels 24 travel. As shown in FIGS. 4-8, the damper 12 is composed of two flywheels 30 as a second member joined to the motor output shaft 10 and a middle rotation member 32 as a first member interposed between the two flywheels 30 and joined to the engine output shaft 8. The flywheels 30 have four first attaching portions 34 which are arranged at equiangular intervals in the circumferential direction. The middle rotation member 32 has four second attaching portions 36 which are arranged at equiangular intervals in the circumferential direction. As shown in FIG. 5, coil springs 38 as elastic members are respectively arranged inside the first attaching portions 34 and the second attaching portions 36 with the first attaching portions 34 and the second attaching portions 36 correspondingly laying one on the other. The coil springs 38 urge the respective opposite end portions of the first attaching portions 34 and the second attaching portions 36 in the circumferential direction, so that the first attaching portions 34 and the second attaching portions 36 are held in a neutral position where one of them is correspondingly laid on the other in the circumferential direction.

The impact due to variations in rotation between the engine output shaft 8 and the motor output shaft 10 is absorbed by the coil springs 38. When the flywheels 30 are displaced from the neutral position relative to the middle rotation member 32, the coil springs 38 are compressed as a result that the first attaching portions 34 and the second attaching portions 36 mutually shift in the circumferential direction, so that the motor output shaft 10 and the engine output shaft 8 are urged in a direction to restore the coil springs 38, in other words, to make the first attaching portions 34 and the second attaching portions 36 correspond to each other in the circumferential direction. The clutch 14 makes a clutch plate 14*a* on the motor 6 side and a clutch plate 14*b* on the engine 4 side come close to, or separate from, each other to connect or disconnect the transmitting torque.

A rotor (not shown) in the motor 6 is provided with permanent magnets and the like, and a stator coil (exciting coil: not shown) surrounds the rotor (not shown). The stator coil is electrified to generate a rotating magnetic field, so that the motor 6 operates as an electric motor for rotating the rotor. The rotor is rotated by an external force which is transmitted from the wheels 24 through the driving shaft 18, to generate an alternating field, so that the motor 6 also operates as a generator that generates electric current through the stator coil. Although in the present embodiment, the engine starting device 2 is constructed to be provided with one motor 6, it may be individually provided with a motor and a generator.

The motor 6 is connected to a battery 46 through a motor control unit and inverter (referred to as motor control unit or MCU in abbreviation). When the motor 6 operates as electric motor, the battery 46 applies electric current to rotate the rotor. When the motor 6 operates as generator, on the other hand, the generated electric power induced in the stator coil is charged to be stored.

An engine rotational position detecting sensor (for example, rotary encoder) 48 for detecting the rotational position of the engine output shaft 8 is provided on the engine output shaft 8 side of the damper 12. A motor rotational position detecting sensor (for example, rotary encoder) 50 for detecting the rotational position of the motor output shaft 10 is provided on the motor output shaft 10 side of the damper 12. The rotational positions of the engine output shaft 8 and the motor output shaft 10 are detected on the basis of an initial rotational position thereof. The initial rotational position of the motor output shaft 10 is the rotational position the motor 6 takes before being rotated in the motor reverse rotation driving, while the initial rotational position of the engine output shaft 8 is the rotational position before the starting rotation. The engine rotational position detecting sensor 48 and the motor rotational position detecting sensor 50 constitute a rotational position detecting section that detects rotational positions (rotational angles θ) relative to the initial rotational positions.

However, when the engine output shaft 8 rotates as is the case that the engine 4 cannot be ignited at an engine starting step referred to later, it becomes unable to execute a control that makes the damper 12 store an urging force on the basis of the initial rotational position 0°. Therefore, in that case, such control is carried out by using a torsion angle α through which the engine output shaft 8 and the motor output shaft 10 in the damper 12 are relatively displaced from the neutral position. This torsion angle α can be calculated from the difference between the respective rotational angles calculated by the motor rotational position detecting sensor 50 and the engine rotational position detecting sensor 48. Assuming the rotational angle of the motor output shaft as θm and the rotational angle of the engine output shaft as θe, then there applies a relation of α=θm−θe.

The rotation of the motor output shaft 10 is controlled by the MCU 52. The MCU 52 constitutes a reverse rotation driving control mechanism, an urging force releasing control mechanism, and a normal rotation driving control mechanism.

Figure 8:
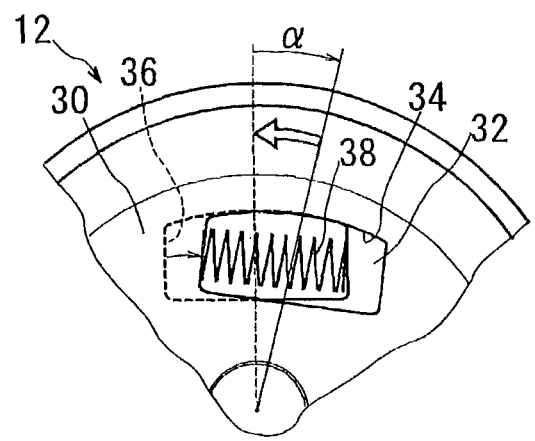
FIG. 8 is a view showing a state of the damper being in the normal rotation.
Figure 9:
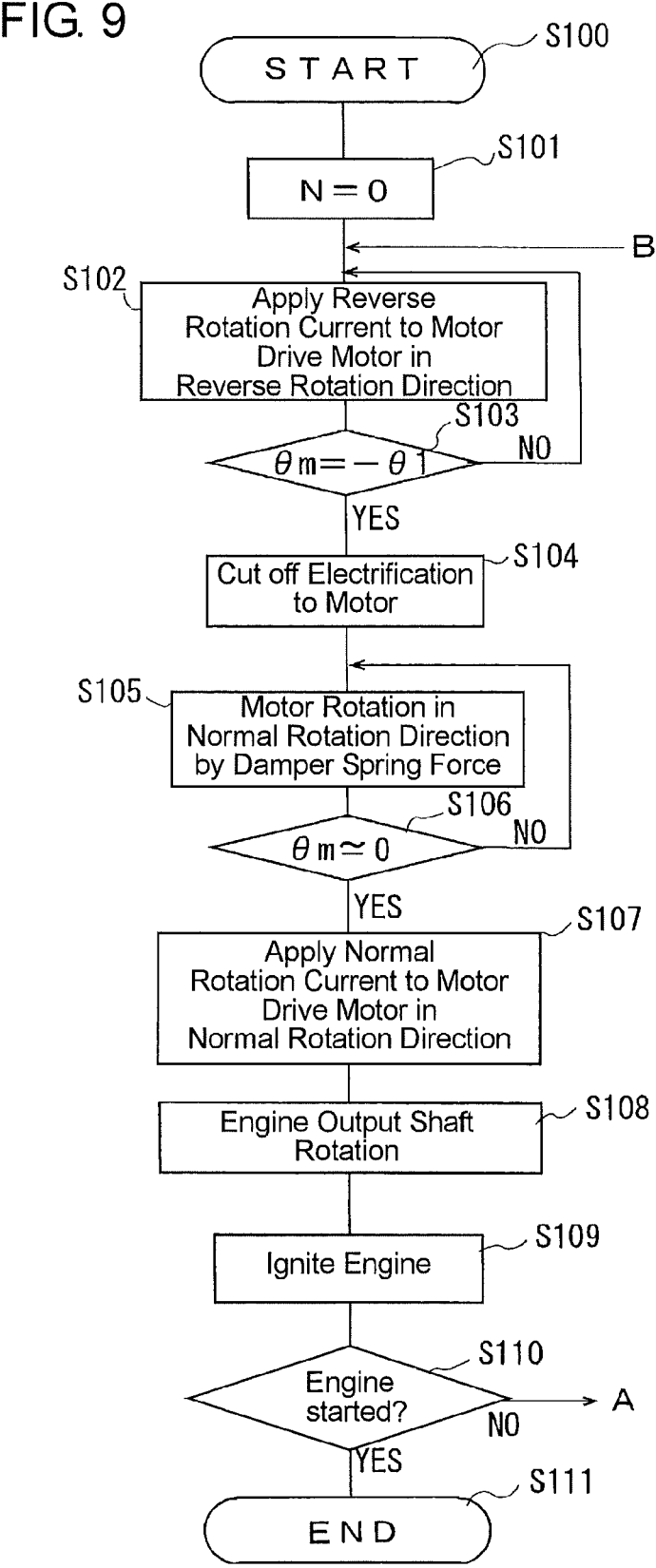
FIG. 9 is a flow chart showing an engine stating control.

Hereinafter, the operation of the engine starting device 2 as constructed above will be described with reference to FIGS. 1 through 10. First of all, as shown in FIG. 9, movement is made from an engine stop state to an engine starting mode, and an engine starting control is initiated by the MCU 52 (S100). At the initial rotational position before the motor output shaft 10 begins to rotate, the rotational angles θ are 0° as indicated at (1) in FIG. 2 and as shown in FIG. 5, and before the engine output shaft 8 begins to rotate at the damper 12, the rotational angles θ are the same as the relative rotational angle (torsion angle) α of the motor output shaft 10 relative to the engine output shaft 8.

Then, the MCU 52 sets a counter that indicates the repetition of the engine starting control loop, as N=0 (S101).

Thereafter, by a command from the MCU 52, it is started to apply to the motor 6 reverse rotation current that drives the motor output shaft 10 in the reverse direction (in the opposite direction to the rotation direction of the engine output shaft 8), whereby the motor output shaft 10 is rotated in the reverse rotation direction (S102). At this time, the engine output shaft 8 is in the stopped state, and the flywheels 30 connected to the motor output shaft 10 are rotated clockwise in FIG. 5, whereby the relative rotational angle θ relative to the initial rotational position 0° takes place in the minus direction because the motor output shaft 10 only is reversely rotated. Thus, the coli springs 38 in the damper 12 are elastically deformed in a compression direction (motor reverse rotation driving step). By the elastic deformation, a force that urges the motor output shaft 10 in the normal rotation direction (the rotation direction of the engine output shaft 8) is stored in the coil springs 38.

Figure 6:
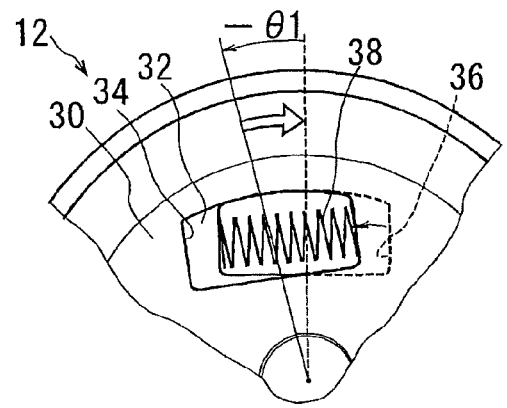
FIG. 6 is a view showing a state of the damper being in a reverse rotation.

Then, when it is detected by the motor rotational position detecting sensor 50 that the rotational angle θm of the motor output shaft 10 has reached −θ1 being a predetermined driving rotation stopping position (S103), the application of the reverse rotation current to the motor 6 is cut off by a command from the MCU 52, whereby the driving rotation of the motor output shaft 10 in the reverse rotation direction is stopped (S104). By this stopping of the reverse rotation driving, the motor output shaft 10 is brought into a freely rotatable state of being small in rotational resistance. As a result, as indicated at (2)-(3) in FIG. 2, the urging force stored in the coil springs 38 is released to rotate the motor output shaft 10 in the normal rotation direction (urged normal rotation step: S105). When the motor output shaft 10 is rotated in the normal rotation direction, the flywheels 30 rotate relative to the middle rotation member 32 clockwise as shown in FIG. 6.

Figure 7:
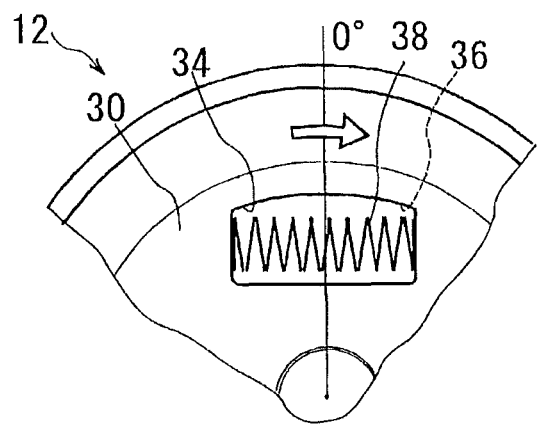
FIG. 7 is a view showing a state of the damper being in a normal rotation.

Then, when it is detected by the motor rotational position detecting sensor 50 that as shown in FIG. 7, the rotational angle θm of the motor output shaft 10 rotating in the normal rotation direction is at the vicinity of the initial rotational position 0° being a predetermined driving rotation starting position (for example, within the range t1 in FIG. 2 and at (4) in FIG. 2) (rotational position detecting step: S106), normal rotation current is applied by a command from the MCU 52 to the motor 6 to drive the motor output shaft 10 in the normal rotation direction (motor normal rotation driving step: S107). By the driving rotation of the motor 6, the engine output shaft 8 is rotated (S108: at (5) in FIG. 2), and the engine output shaft 8 is rotated up to, for example, 500-600 rpm which is a rotational speed required for the starting of the engine 4, and the engine is ignited (engine start igniting step: S109: at (6) in FIG. 2).

The engine rotational position detecting sensor 48 detects whether the engine 4 has started or not (S110). When the engine starting is detected by the engine rotational position detecting sensor 48, the MCU 52 terminates the engine starting control (S111).

Figure 10:
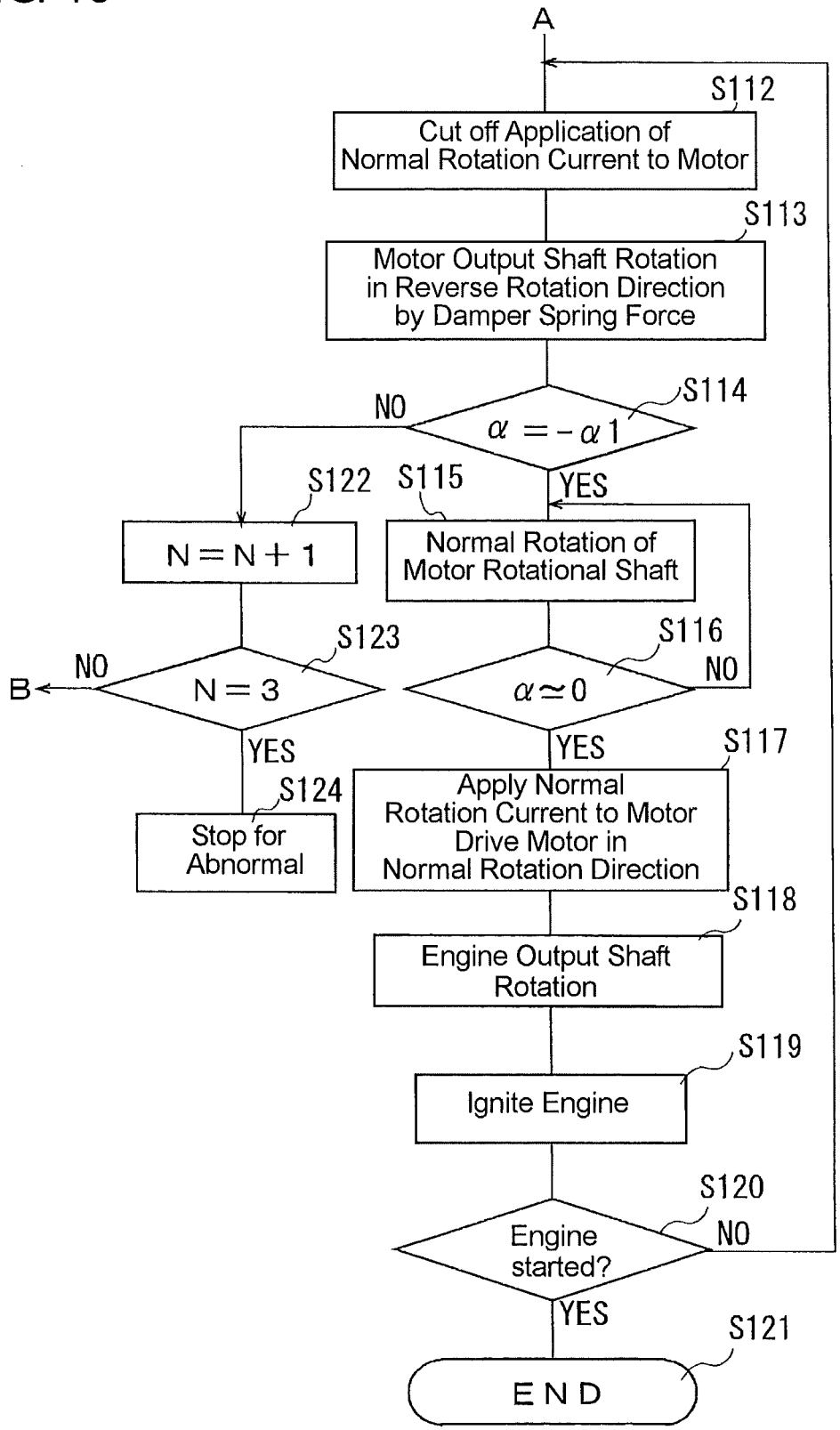
FIG. 10 is a flow chart showing the engine stating control.
Figure 11:
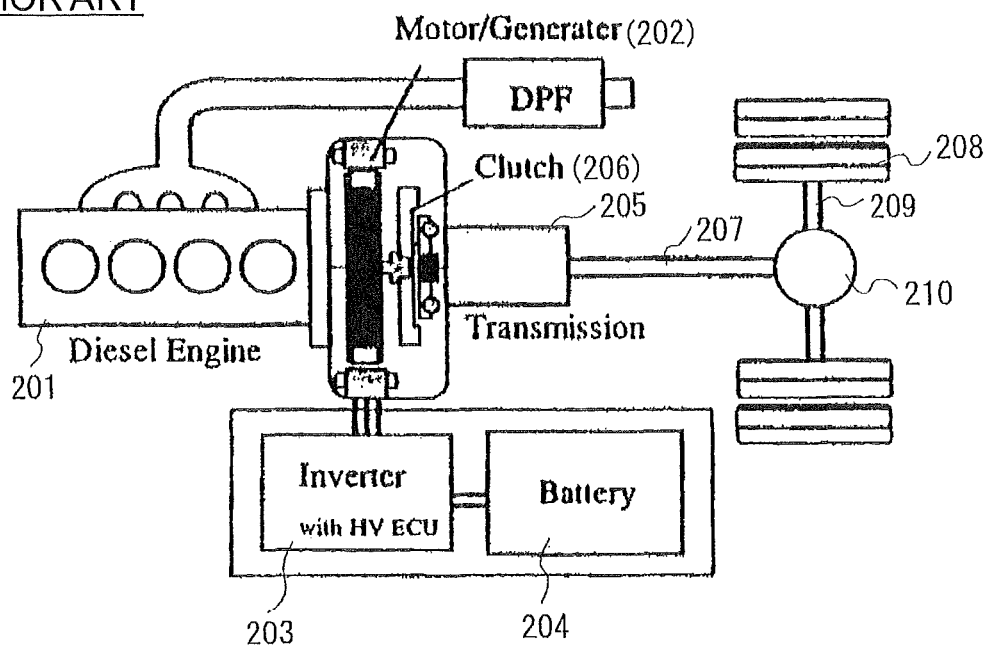
FIG. 11 is a schematic diagram of a parallel-type hybrid drive system in the prior art.

When it is detected by the engine rotational position detecting sensor 48 that the starting of the engine 4 cannot be done, the MCU 52 moves the processing to S112, as shown in FIG. 10. Because as mentioned earlier, the engine output shaft 8 rotates a little even at the time of being unsuccessful in the starting, it becomes unable to execute the control on the basis of the initial rotational position 0°. In such a case, although it is possible to reset the stop position of the motor output shaft 10 as a new initial rotational position 0°, the aforementioned torsion angle α representing the relative displacement of the engine output shaft 8 to the motor output shaft 10 is used in performing the control in the present embodiment.

Figure 3:
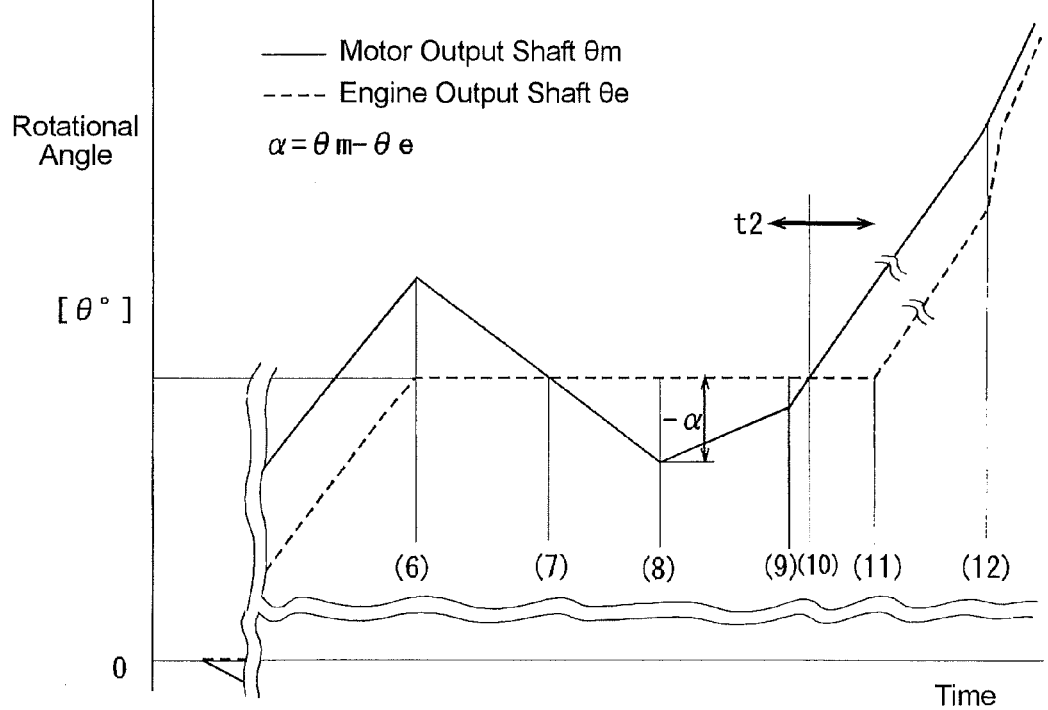
FIG. 3 is a graph showing the time-dependent variations in rotational angle of the motor output shaft and the engine output shaft at the time of an engine ignition restarting.
Figure 4:
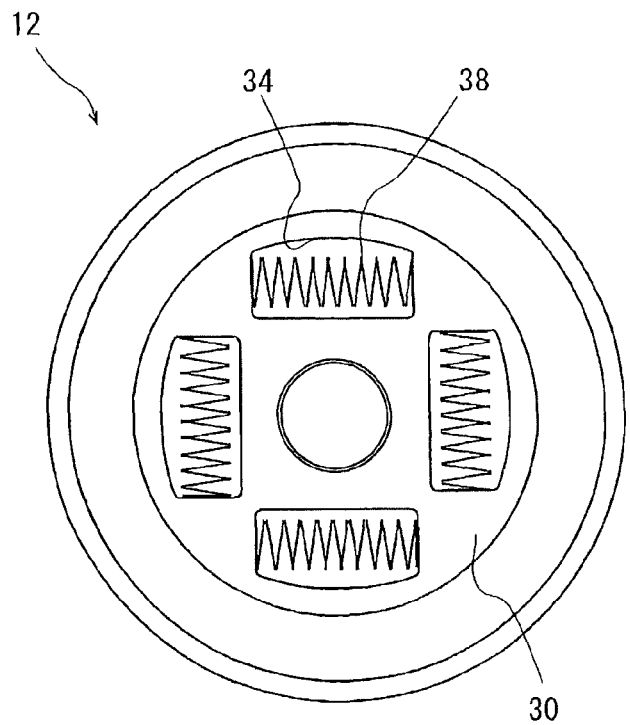
FIG. 4 is a front view of a damper used in the parallel-type hybrid drive system.

In the beginning, the application of the normal rotation current to the motor 6 is cut off to stop the driving rotation of the motor output shaft 10 in the normal rotation direction (S112: at (6) in FIG. 3). Before the stopping of the motor output shaft 10, as shown in FIG. 8, the coil springs 38 are in the state of being compressed as a result that the motor output shaft 10 and the engine output shaft 8 have been relatively displaced by the torsion angle α. On the other hand, by the stopping of the normal rotation driving, the motor output shaft 10 is brought into a freely rotatable state of being small in rotational resistance. Thus, the urging force stored in the coil springs 38 is released to rotate the motor output shaft 10 in the reverse rotation direction (S113). When the motor output shaft 10 is rotated in the reverse rotation direction, the flywheels 30 rotate relative to the middle rotation member 32 counterclockwise in FIG. 8. Then, since the motor output shaft 10 further reversely rotates beyond the neutral position (at (7) in FIG. 3), an urging force that urges the motor output shaft 10 in the normal rotation direction is stored in the coil springs 38.

The reverse rotation of the motor output shaft 10 is stopped by the urging force in the normal rotation direction of the coil springs 38. Because a damping occurs in the rotation of the motor output shaft 10, the MCU 52 makes a judgment of whether or not the torsion angle α has reached a threshold value −α1 that is deemed to be able to store an effective urging force (storing judgment step: S114).

Where the torsion angle α has reached the threshold value −α1, subsequently to the stopping of the reverse rotation of the motor output shaft 10, the motor output shaft 10 being in the freely rotatable state is rotated in the normal rotation direction by the stored urging force of the coil springs 38 being directed in the normal rotation direction (urged normal re-rotation step: S115: at (8)-(9) in FIG. 3).

Then, when, with the motor output shaft 10 being rotated by the urging force in the normal rotation direction, the motor rotational position detecting sensor 50 and the engine rotational position detecting sensor 48 detect that the torsion angle α is at the vicinity to α=0 being the neutral position (within the range t2 in FIG. 3) (S116), normal rotation current is applied to the motor 6 by a command from the MCU 52 to drivingly rotate the motor output shaft 10 in the normal rotation direction (motor normal re-rotation driving step: S117: at (9), (10) and (11) in FIG. 3). By the driving rotation of the motor output shaft 10, the engine output shaft 8 is rotated up to the required rotational speed (S118: at (12) in FIG. 3), and the engine is ignited (engine restart igniting step: S119).

The engine rotational position detecting sensor 48 detects whether the engine 4 has started or not (S120). When the starting of the engine 4 is detected, the MCU 52 terminates the engine starting control (S121).

When the engine 4 is not started, the MCU 52 moves the processing to S112, whereby the application of the normal rotation current to the motor 6 is cut off to execute the controls subsequent to S112.

If the torsion angle α does not reach the threshold value −α1 at the S114, the MCU 52 moves the processing to S122 to increment 1 to the engine starting control repetition number N in the counter (S122). Then, the MCU 52 judges whether or not the engine starting control repetition number N has reached, for example, 3 (S123). Unless the repetition number N has reached 3, the MCU 521 moves the processing to S102 and executes the controls at S102 and those subsequent thereto. In this case, however, the controls are executed not by using the motor rotational angle θm taking the basis of the initial rotational position 0° but by using the torsion angle α. If the repetition number N has reached 3, the MCU 52 stops the engine starting control (S124).

In the engine staring method in the engine starting device 2 constructed above, the force that urges the motor output shaft 10 in the normal rotation direction is stored by elastically deforming the coil springs 38 in the damper 12 at the motor reverse rotation driving step, and the motor output shaft 10 is rotated in the normal rotation direction by releasing the stored urged force at the urged normal rotation step. Then, when the motor output shaft 10 is being rotated by the urging force in the normal rotation direction, the motor output shaft 10 is drivingly rotated in the normal rotation direction at the motor normal rotation driving step, and the rotational speed of the motor and the engine is increased up to the rotational speed which is required for the ignition of the engine 4 at the engine start igniting step.

In this way, the stating torque that the motor 6 should undertake can be decreased by the torque that is urged by the use of the coil springs 38 in the normal rotation direction, so that the downsizing of the motor 6 can be attained. Further, by attaining the downsizing of the motor 6, it becomes possible to realize the reduction in material costs, the downsizing of manufacturing facilities, and the shortening of assembling man-hours, so that reductions in cost can be attained.

Further, when the motor output shaft 10 rotates in the normal rotation direction following the reverse rotation and returns to the vicinity of the initial rotational position 0° (for example, within the range t1 in FIG. 2) is the time that most energy of the elastic deformation of the coil springs 38 has been converted into the kinetic energy of the motor output shaft 10. Therefore, by driving the motor 6 at the initial rotational position 0°, the kinetic energy of the motor output shaft 10 produced by the urging can be utilized most efficiently, so that it is possible to drivingly rotate the motor output shaft 10 with a small stating torque.

Further, where the engine 4 does not start at the engine start igniting step, the application of the normal rotation current to the motor 6 is stopped. Thus, although the normal rotation driving of the motor output shaft 10 is stopped, the aforementioned normal rotation of the motor output shaft 10 causes the flywheels 30 connected to the motor output shaft 10 to be relatively displaced from the neutral position in the normal rotation direction relative to the middle rotation member 32 connected to the engine output shaft 8. The coil springs 38 are subjected to an elastic deformation that urges the motor output shaft 10 in the reverse rotation direction. Thus, the motor output shaft 10 is reversely rotated by the urging force in the reverse rotation direction of the coil springs 38. Since the reversely rotating motor output shaft 10 is further reversely rotated by its inertia force beyond the neutral position (α=0), the flywheels 30 are relatively displaced in the reverse rotation direction relative to the middle rotation member 32, whereby a force that urges the motor output shaft 10 in the normal rotation direction is stored again. The urging force stored again causes the motor output shaft 10 to rotate in the normal rotation direction (urged normal re-rotation step).

When the urging force is causing the motor output shaft 10 rotate in the normal rotation direction, the normal rotation current is applied to the motor 6 to drivingly rotate the motor output shaft 10 in the normal rotation direction (motor normal re-rotation driving step), and the rotational speed of the motor output shaft 10 and the engine output shaft 8 are increased up to the rotational speed required for the ignition of the engine 4, after which the engine 4 is ignited (engine restart igniting step). In this case, it is considered that the urging force stored in the coil springs 38 by the inertial force of the reversely rotating motor output shaft 10 is smaller than the urging force stored by the reverse rotation driving of the motor 6 and that the motor torque in the preceding electrification is insufficient for the engine starting, and thus, the normal rotation driving of the motor 6 requires a larger current value than the current value that was applied in the preceding motor normal rotation driving step. Therefore, by applying larger normal rotation current, the torque to be undertaken by the motor 6 is increased to enhance the reliability in starting the engine 4. When the case of being unable to start the engine 4 is repeated a plural number of times as mentioned above, the electric current applied to the motor 6 is incremented from the preceding electric current thereto, so that the starting of the engine 4 can be enhanced in reliability.

Further, at the time of regeneration in which the deceleration of the vehicle causes a transmission torque from the wheel 24 side to rotate the motor output shaft 10, the transmission of the torque to the engine output shaft 8 is cut off by the clutch 14. Thus, the rotational resistance due to the engine output shaft 8 can be eliminated, so that it becomes possible to store much more regenerative energy.

Although using coil springs, the elastic members in the damper are not limited to such coil springs and may be those using, for example, helical springs, torsion springs, rubbers or the like.

Further, although being composed of the engine rotational position detecting sensor 48 using the rotary encoder and the motor rotational position detecting sensor 50 also using the rotary encoder, the rotational position detecting section is not limited to those and may be, for example, a potentiometer that detects the relative angle of the motor output shaft to the engine output shaft.

Various features and many of the attendant advantages in the foregoing embodiment will be summarized as follows:

According to the engine starting method in the embodiment typically shown in FIGS. 1, 5-8 and 9, by driving the motor output shaft 10 in the reverse rotation direction at the motor reverse rotation driving step S102, the second member 30 of the damper 12 is relatively displaced relative to the first member 32 from the neutral position 0° in the reverse rotation direction to elastically deform the elastic member 38 thereby to store the force that urges the motor output shaft 10 in the normal rotation direction, and the stored urging force is released to rotate the motor output shaft 10 in the normal rotation direction. Then, when the motor output shaft 10 is being rotated by the urging force in the normal rotation direction (S105), by drivingly rotating the motor output shaft 10 in the normal rotation direction at the motor normal rotation driving step S107, the rotation speed of the motor 6 and the engine 4 is increased up to the rotational speed required for ignition of the engine 4 at the engine start igniting step S109.

In this way, the motor output shaft 10 is urged and rotated in the normal rotation direction by using the elastic member 38 in the damper 12, so that it becomes possible to reduce the starting torque the motor 6 should undertake, by the portion of rotation brought about by the urging force and hence, to downsize the motor 6. Further, by downsizing the motor 6, it becomes possible to realize the reduction in material costs, the downsizing of manufacturing facilities and the shortening in man-hours for assembling and hence, to attain the reduction in costs.

According to the engine starting method in the embodiment typically shown in FIGS. 1, 2 and 7, when the motor output shaft 10 returns to the vicinity (t1 in FIG. 2) of the initial rotational position (at (4) in FIG. 2) by the normal rotation subsequent to the reverse rotation is the time that most energy of the elastic deformation of the elastic member 38 produced by the reverse rotation of the motor output shaft 10 has been converted into the kinetic energy of the motor output shaft 10. Therefore, by effecting the normal rotation driving of the motor at the vicinity (t1 in FIG. 2) of the initial rotational position (at (4) in FIG. 2), the kinetic energy of the motor output shaft 10 produced by being urged can be utilized most effectively, so that it is possible to drivingly rotate the motor output shaft 10 with a small starting torque.

According to the engine starting method in the embodiment typically shown in FIGS. 1, 3 and 8-10, where the engine 4 does not start (NO at S110), at the urged normal re-rotation step S112, the electrification to the motor 6 is stopped and the motor output shaft 10 is stopped from the normal rotation driving, in which case, the normal rotation before the stopping causes the second member 30 connected to the motor output shaft 10 to be displaced from the neutral position 0° in the normal rotation direction relative to the first member 32 connected to the engine output shaft 8, whereby the elastic member 38 is given an elastic deformation that urges the motor output shaft 10 in the reverse rotation direction. As a result, the motor output shaft 10 is reversely rotated by the urging force in the reverse rotation direction (at (6)-(7) in FIG. 3). The inertia force of the reversely rotating motor output shaft 10 causes the motor output shaft 10 to further reversely rotate beyond the neutral position 0° (at (7)-(8) in FIG. 3), and thus, the second member 30 is relatively displaced relative to the first member 32 in the reverse rotation direction, whereby the force that urges the motor output shaft 10 in the normal rotation direction is stored again in the elastic member 38. Then, the motor output shaft 10 is rotated by the again stored urging force in the normal rotation direction (at (8)-(9) in FIG. 3). When the urging force brings about the rotation in the normal rotation direction (S115 in FIG. 10), the normal rotation current is applied to the motor 6 at the motor normal re-rotation driving step S117 to drivingly rotate the motor output shaft 10 in the normal rotation direction to increase the rotational speed of the motor 6 and the engine 4 up to the rotational speed required for igniting the engine (at (10)-(12) in FIG. 3), and the engine 4 is ignited at the engine restart igniting step S119 (at (12) in FIG. 3). In this case, because it is considered that the urging force which is stored by the inertia force of the reversely rotating motor output shaft 10 for rotating the motor output shaft 10 in the normal rotation direction is smaller than the urging force that is stored by the reverse rotation driving (S102) of the motor 6 and that the motor torque given by the preceding electrification (S107) was insufficient for the engine 4 to start, the application of larger normal rotation current becomes necessary in the motor normal rotation driving. For this reason, by applying larger current (S117) than the current which was applied at the preceding motor normal rotation driving step S107, the share of torque that the motor 6 should undertake is increased, so that the reliability in igniting the engine 4 can be enhanced.

According to the engine starting method in the embodiment typically shown in FIGS. 1 and 8-10, even in the occurrence of damping in the rotation of the motor output shaft 10, it is judged whether or not there reached a threshold value ($\alpha=-\alpha$ at S114) which is deemed to enable the elastic member 38 to store an effective urging force, and if the threshed value is reached (YES at S114), the urged normal re-rotation step S115 is executed to rotate the motor output shaft 10 in the normal rotation direction by the urging force of the elastic member 38. If the threshold value is judged not to have been reached (NO at S114), the motor reverse rotation driving step S102, the urged normal re-rotation step S105, the motor normal rotation driving step S107 and the engine start igniting step S108 are executed the predetermined number of times (N=3 at S123).

According to the engine starting method in the embodiment typically shown in FIGS. 1, 2, 7 and 9, when it is detected at the rotational position detecting step S106 after the execution of the urged normal re-rotation step S105 that the rotational angle θm of the motor output shaft 10 rotating in the normal rotation direction is at the vicinity (t1 in FIG. 2) of the initial rotational position 0°, the motor output shaft 10 is drivingly rotated in the normal rotation direction at the motor normal rotation driving step S107.

According to the engine starting device in the embodiment typically shown in FIGS. 1, 2, 4-7 and 9, the reverse rotation current is applied by the reverse rotation driving control mechanism 52, S102 to the motor 6 to reversely rotate the motor output shaft 10 thereby to displace the second member 30 of the damper 12 relative to the first member 32 in the reverse rotation direction, whereby the elastic member 38 is elastically deformed to store the force that urges the motor output shaft 10 in the normal rotation direction. When the predetermined driving rotation stopping position −θ1 is detected by the rotational position detecting section 50, 52, S103, the application of the reverse rotation current to the motor 6 is stopped by the urged force releasing control mechanism 52, S104, whereby the motor output shaft 10 is rotated in the normal rotation direction by the urging force having been stored in the elastic member 38. Then, when, with the motor output shaft 10 being rotated by the urging force in the normal rotation direction, it is detected by the rotational position detecting section 50, 52 that the rotational position θm of the motor output shaft 10 has reached the predetermined driving rotation starting position (t1 in FIG. 2), the normal rotation current is applied to the motor 6 by the normal rotation driving control mechanism 52, S107. Thus, the motor output shaft 10 is started to be drivingly rotated in the normal rotation direction to increase the rotational speed of the motor 6 and the engine 4 up to the rotational speed required for ignition of the engine 4. The starting torque the motor 6 should undertake can be decreased by the portion of torque that urges the motor output shaft 10 in the normal rotation direction by using the elastic member 38 in the damper 12, so that it is possible to provide the motor 6 which is downsized in this way.

According to the engine starting device in the embodiment typically shown in FIG. 1, in addition to realizing the engine starting by the downsized motor 6, it is possible to eliminate the resistance caused by the rotation of the engine output shaft 8 and hence, to efficiently accumulate the regenerative energy brought about by the rotation of the motor output shaft 10 by cutting off the transmission of rotation to the engine output shaft 8 by using the clutch 14 at the time of regeneration in which the deceleration of the vehicle causes the transmission torque from the wheel 24 side to rotate the motor output shaft 10.

According to the engine starting device in the embodiment typically shown in FIGS. 1, 3, 8 and 10, by making the motor 6 generate torques intermittently and incrementally in either direction of the normal rotation direction and the reverse rotation direction, vibration is generated that displaces the second member 30 relative to the first member 31 beyond the neutral position 0° in the normal rotation direction and the reverse rotation direction. In the case of the displacement in the normal rotation direction, the elastic member 38 stores the force that urges the motor output shaft 10 in the reverse rotation direction, and in the case of the displacement in the reverse rotation direction, it stores the force that urges the motor output shaft 10 in the normal rotation direction. Then, at the timing that the motor output shaft returns to the vicinity (t2 in FIG. 3) of the initial rotational position 0° and has kinetic energy in the normal rotation direction S106, the driving of the motor output shaft 10 in the normal rotation direction is started S107, so that the starting torque that the motor 6 should undertake can be reduced by the portion which is given by the elastic member 38 to urge the motor output shaft 10.

As described above, the specific constructions described in the aforementioned embodiment are no more than the exemplification of the present invention. The present invention is not limited to such specific constructions and may take various forms without departing from the gist of the present invention.

The application is made to a parallel-type hybrid vehicle in which a motor device used at the time of traveling is also used at the time of engine starting.

The invention claimed is:

1. An engine starting method comprising:
a motor reverse rotation driving step of applying reverse rotation current to a motor to drivingly rotate a motor output shaft connected to the motor from an initial rotational position at which the motor begins to rotate, in a reverse rotation direction opposite in rotation to a normal rotation direction for the motor output shaft whereby by the driving in the reverse rotation direction, a second member connected to the motor output shaft is displaced relative to a first member connected to an engine output shaft, in the reverse rotation direction from a neutral position where the first member and the second member correspond to each other in the circumferential direction, to elastically deform an elastic member thereby to make the elastic member store an urging force that urges the motor output shaft in the normal rotation direction;
an urged normal rotation step of stopping the electrification to the motor to release the urging force of the elastic member to make the motor output shaft rotate in the normal rotation direction so that the second member having been displaced from the neutral position relative to the first member in the reverse rotation direction returns to the neutral position;
a motor normal rotation driving step of applying normal rotation current to the motor to drivingly rotate the motor output shaft in the normal rotation direction; and
an engine start igniting step of igniting an engine with the engine output shaft being rotated by the rotation at the motor normal rotation driving step,
wherein the driving rotation of the motor output shaft at the motor normal rotation driving step is started when the motor output shaft returns to the vicinity of the initial rotational position and has kinetic energy in the normal rotation direction.

2. The engine starting method in claim 1, further comprising for the case that the engine cannot be started at the engine start igniting step:
an urged normal re-rotation step of stopping the application of the normal rotation current to the motor whereby the second member rotated subsequently by a restoring force of the elastic member in the reverse rotation direction is displaced relative to the first member beyond the neutral position to make the elastic member store a force that urges the motor output shaft in the normal rotation direction and whereby the motor output shaft is rotated by the stored urging force in the normal rotation direction;
a motor normal re-rotation driving step of applying normal rotation current which is large than that at the preceding motor normal rotation driving step, to the motor to drivingly rotate the motor output shaft in the normal rotation direction; and
an engine restart igniting step of igniting the engine with the engine output shaft being rotated by the rotation at the motor normal re-rotation driving step.

3. The engine starting method in claim 2, further comprising:
a storing judging step of judging, after stopping the application of the normal rotation current to the motor, whether or not a torsion angle through which the engine output shaft and the motor output shaft are relatively displaced from the neutral position has reached a threshold value for the elastic member to store the force urging the motor output shaft in the normal rotation direction,
wherein the urged normal re-rotation step is executed based on the storing judging step if the force urging the motor output shaft in the normal rotation direction reaches the threshold value; and
wherein the motor reverse rotation driving step, the urged normal re-rotation step, the motor normal rotation driving step and the engine start igniting step are executed by a predetermined number of times based on the storing judging step if the force urging the motor output shaft in the normal rotation direction does not reach the threshold value.

4. The engine starting method in claim 1, further comprising a rotational position detecting step of judging, after the execution of the urged normal rotation step, whether or not the rotational angle of the motor output shaft rotating in the normal rotation direction is at the vicinity of the initial rotational position.

5. An engine starting device comprising:
- an engine output shaft and a motor output shaft provided between an engine and a motor that are provided for driving a vehicle;
- a damper having an elastic member that absorbs variations in rotation of the engine output shaft and the motor output shaft;
- the damper having a first member connected to the engine output shaft and a second member connected to the motor output shaft, and the elastic member being interposed between the first member and the second member;
- a rotational position detecting section that detects the rotational position of the motor output shaft relative to the engine output shaft;
- a reverse rotation driving control mechanism that applies reverse rotation current to the motor to rotationally drive the motor output shaft from an initial rotational position at which the motor begins to rotate, in a reverse rotation direction opposite to a normal rotation direction whereby by the driving of the motor output shaft in the reverse rotation direction, the second member is displaced in the reverse rotation direction of the motor from a neutral position at which the first member corresponds to the second member in a circumferential direction, to make the elastic member store an urging force that urges the motor output shaft in the normal rotation direction;
- an urging force releasing control mechanism that detects by the rotational position detecting section a predetermined driving rotation stopping position of the motor output shaft rotated by the reverse rotation driving control mechanism in the reverse rotation direction and that stops the application of the reverse rotation current based on a detection signal from the rotational position detecting section to release the urging force of the elastic member so that the second member displaced from the neutral position in the reverse rotation direction returns to the neutral position; and
- a normal rotation driving control mechanism that detects by the rotational position detecting section a predetermined driving rotation starting position of the motor output shaft rotated by the urging force of the elastic member in the normal rotation direction of the engine output shaft and that applies normal rotation current to the motor based on a detection signal from the rotational position detecting section to rotationally drive the motor output shaft in the normal rotation direction,
- wherein the predetermined driving rotation starting position is set to the vicinity of the initial rotational position to which the motor output shaft returns and where the motor output shaft has kinetic energy in the normal rotation direction.

6. The engine starting device in claim 5, wherein a clutch that performs the transmission and cutoff of a torque is provided between the damper and the motor.

7. The engine starting device in claim 5, wherein after the damper is caused to generate vibration by making the motor generate torques intermittently and incrementally in the normal rotation direction and the reverse rotation direction so that elastic vibration of the damper increases, the driving of the motor output shaft in the normal rotation direction is started when the motor output shaft returns to the vicinity of the initial rotational position and has kinetic energy in the normal rotation direction.

* * * * *